United States Patent
Jung et al.

(10) Patent No.: US 9,236,198 B2
(45) Date of Patent: Jan. 12, 2016

(54) CHIP-TYPE ELECTRIC DOUBLE LAYER CAPACITOR CELL AND METHOD OF MANUFACTURING THE SAME

(71) Applicant: SAMSUNG ELECTRO-MECHANICS CO., LTD., Suwon (KR)

(72) Inventors: Chang Ryul Jung, Seoul (KR); Sung Ho Lee, Seongnam (KR); Dong Sup Park, Suwon (KR); Hyun Chul Jung, Yongin (KR); Yeong Su Cho, Guri (KR); Sang Kyun Lee, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/264,835

(22) Filed: Apr. 29, 2014

(65) Prior Publication Data

US 2014/0233155 A1    Aug. 21, 2014

Related U.S. Application Data

(62) Division of application No. 12/923,950, filed on Oct. 15, 2010, now abandoned.

(30) Foreign Application Priority Data

Nov. 5, 2009 (KR) .................. 10-2009-0106574
Nov. 5, 2009 (KR) .................. 10-2009-0106575

(51) Int. Cl.
*H01G 11/80* (2013.01)
*H01G 11/74* (2013.01)
(Continued)

(52) U.S. Cl.
CPC .............. *H01G 11/80* (2013.01); *H01G 9/016* (2013.01); *H01G 9/10* (2013.01); *H01G 9/155* (2013.01);
(Continued)

(58) Field of Classification Search
CPC ........ H01G 11/82; H01G 11/80; H01G 11/78
USPC ......................................................... 361/502
See application file for complete search history.

(56) References Cited

U.S. PATENT DOCUMENTS 3,215,304 A    11/1965    Rohe .............................. 429/176
3,276,913 A    10/1966    Sabatino et al. .............. 429/185
(Continued)

FOREIGN PATENT DOCUMENTS

CN    1114780    1/1996
JP    64-73612    3/1989
(Continued)

OTHER PUBLICATIONS

Korean Office Action issued Mar. 21, 2011 in corresponding Korean Patent Application 10-2009-0106575.
(Continued)

*Primary Examiner* — David M Sinclair
(74) *Attorney, Agent, or Firm* — McDermott Will & Emery LLP

(57) ABSTRACT

A chip-type electric double layer capacitor includes: a resin case having a housing space provided therein and formed of insulating resin; first and second external terminals inserted into the resin case by insert injection molding, each having a first portion exposed to an outer surface of the resin case for external contact and a second portion exposed to an inner surface of the housing space for internal contact; a sealing portion including a groove portion provided in the resin case along a circumference of at least one of the first and second external terminals and a resin filling the groove portion; and an electric double layer capacitor cell mounted in the housing space and electrically connected to the second portion of the first and second external terminals.

13 Claims, 7 Drawing Sheets

(51) Int. Cl.
- *H01G 11/82* (2013.01)
- *H01G 9/008* (2006.01)
- *H01G 9/10* (2006.01)
- *H01G 9/00* (2006.01)
- *H01G 11/84* (2013.01)

(52) U.S. Cl.
CPC ............... *H01G 11/74* (2013.01); *H01G 11/82* (2013.01); *H01G 11/84* (2013.01); *Y02E 60/13* (2013.01); *Y02T 10/7022* (2013.01); *Y10T 29/417* (2015.01)

(56) References Cited

U.S. PATENT DOCUMENTS

| | | | |
|---|---|---|---|
| 3,647,556 A | 3/1972 | Cox | 429/82 |
| 4,488,203 A * | 12/1984 | Muranaka et al. | 361/502 |
| 4,663,824 A | 5/1987 | Kenmochi | 29/25.03 |
| 4,737,889 A | 4/1988 | Nishino et al. | 361/502 |
| 4,769,745 A | 9/1988 | Viernickel et al. | 361/518 |
| 4,882,115 A | 11/1989 | Schmickl | 361/538 |
| 5,041,696 A | 8/1991 | Utner | 174/562 |
| 5,253,148 A | 10/1993 | Katsu | |
| 5,381,301 A | 1/1995 | Hudis | 361/275.2 |
| 5,638,253 A | 6/1997 | Hasegawa | |
| 5,862,035 A | 1/1999 | Farahmandi et al. | 361/502 |
| 6,310,762 B1 | 10/2001 | Okamura et al. | 361/502 |
| 6,459,564 B1 | 10/2002 | Watanabe et al. | |
| 6,461,763 B1 | 10/2002 | Witzigreuter et al. | 429/163 |
| 6,518,501 B1 | 2/2003 | Kawahara et al. | 174/538 |
| 7,031,140 B2 | 4/2006 | Omura et al. | 361/517 |
| 7,145,763 B2 | 12/2006 | Kim et al. | |
| 7,180,726 B2 | 2/2007 | Thrap | 361/502 |
| 7,248,460 B2 * | 7/2007 | Omura et al. | 361/502 |
| 7,256,981 B2 | 8/2007 | Kosuda et al. | |
| 7,326,261 B2 | 2/2008 | Nagasawa et al. | |
| 7,570,479 B2 | 8/2009 | Lin | 361/535 |
| 8,248,749 B2 * | 8/2012 | Huang et al. | 361/230 |
| 2003/0112581 A1 | 6/2003 | Kwon et al. | 361/502 |
| 2005/0231893 A1 | 10/2005 | Harvey | 361/502 |
| 2008/0123253 A1 | 5/2008 | Funaya | 361/535 |
| 2010/0188800 A1 * | 7/2010 | Ashizaki et al. | 361/502 |
| 2010/0214721 A1 | 8/2010 | Lee et al. | 361/502 |

FOREIGN PATENT DOCUMENTS

| | | |
|---|---|---|
| JP | 8-17686 | 1/1996 |
| JP | 11-191520 | 7/1999 |
| JP | 2001-351589 | 12/2001 |
| JP | 2002-184370 | 6/2002 |
| JP | 2003-163142 | 6/2003 |
| JP | 2003-297317 | 10/2003 |
| JP | 2005-19790 | 1/2005 |
| JP | 2005-166974 | 6/2005 |
| JP | 2005-259728 | 9/2005 |
| JP | 2006-012792 A | 1/2006 |
| JP | 2006-49289 | 2/2006 |
| JP | 2006-128247 | 5/2006 |
| JP | 2007-207920 | 8/2007 |
| JP | 2008-160062 | 7/2008 |
| KR | 1992-0018787 | 10/1992 |

OTHER PUBLICATIONS

Korean Office Action issued Mar. 21, 2011 in corresponding Korean Patent Application 10-2009-0106574.
Chinese Office Action mailed Feb. 27, 2012 issued in corresponding Chinese Patent Application No. 201010542891.5.
Japanese Office Action mailed Feb. 23, 2012 issued in corresponding Japanese Patent Application No. 2010-233842.
Japanese Office Action issued Oct. 16, 2012 in corresponding Japanese Patent Application No. 2010-233842.
Japanese Office Action issued Sep. 24, 2013 in corresponding Japanese Patent Application No. 2013-005442.
Restriction Requirement mailed from the United States Patent and Trademark Office on Oct. 9, 2012 in the related U.S. Appl. No. 12/923,950.
Office Action mailed from the United Stated Patent and Trademark Office on Nov. 20, 2012 in the related U.S. Appl. No. 12/923,950.
Office Action mailed from the United Stated Patent and Trademark Office on Apr. 17, 2013 in the related U.S. Appl. No. 12/923,950.
Office Action mailed from the United Stated Patent and Trademark Office on Aug. 13, 2013 in the related U.S. Appl. No. 12/923,950.
Office Action mailed from the United Stated Patent and Trademark Office on Jan. 29, 2014 in the related U.S. Appl. No. 12/923,950.
U.S. Appl. No. 12/923,950, filed Oct. 15, 2010, Chang Ryul Jung et al., Samsung Electro-Mechanics Co., Ltd.

* cited by examiner

CHIP-TYPE ELECTRIC DOUBLE LAYER CAPACITOR CELL AND METHOD OF MANUFACTURING THE SAME

CROSS-REFERENCE TO RELATED APPLICATIONS

This application is a U.S. divisional application filed under 37 CFR 1.53(b) claiming priority benefit of U.S. Ser. No. 12/923,950 filed in the United States on Oct. 15, 2010, now abandoned, which claims earlier foreign priority benefit to Korean Patent Application Nos. 10-2009-0106574 filed on Nov. 5, 2009 and 10-2009-0106575 filed on Nov. 5, 2009 in the Korean Intellectual Property Office, the disclosures of which are incorporated herein by reference.

BACKGROUND

1. Field

The present invention relates to a chip-type electric double layer capacitor, and more particularly, to a chip-type electric double layer capacitor effectively preventing an electrolyte spill.

2. Description of the Related Art

In various electronic products such as information communication devices, a stable energy supply is considered to be an important element. In general, such a function is performed by a capacitor. That is, the capacitor serves to store electricity in a circuit provided in various electronic products such as information communication devices and then discharge the electricity, thereby stabilizing the flow of electricity within the circuit.

In recent years, a great deal of attention has been paid to an electric double layer capacitor as a product satisfying the requirements of functions that are not served by a conventional condenser or secondary cell, since the electric double layer capacitor has a short charge and discharge time and high output density.

In general, an electric double layer capacitor has intermediate properties between those of a condenser and those of a secondary cell in terms of energy density, output density and charge and discharge cycles.

Unlike a condenser and a secondary cell, an electric double layer capacitor has the advantages of: a simplified electrical circuit and reduced unit cost since overcharge and overdischarge may be avoided; the detection of remaining capacitance by the measuring of voltage; durability within a wide temperature range ($-30°$ C. to $+90°$ C.).; the use of environmentally friendly materials and so on.

An electric double layer capacitor is being utilized as a power source for the backup of home appliances such as cellphones, AVs or cameras, and is expected to be mainly utilized in UPS or HEV/FCEV applications in the future. Particularly, studies are being carried out in order to utilize an electric double layer capacitor as a power source for the ignition and acceleration of a car since the electric double layer capacitor has a life cycle equivalent to that of the lifespan of a car and high output characteristics.

A basic structure of the electric double layer capacitor includes an electrode, an electrolyte, a current collector, and a separator. The electrode has a relatively large surface area, such as that of a porous electrode. The operational principle of the electric double layer capacitor is an electro-chemical mechanism in which electricity is generated when a voltage of several volts is applied to both ends of a unit cell electrode such that ions in the electrolyte move along an electric field to be adsorbed by an electrode surface.

In order to surface mount such an electric double layer capacitor on a circuit board, a bracket is welded over and under the electric double layer capacitor, and the electric double layer capacitor is then mounted on the circuit board through the bracket.

However, the electric double layer capacitor having such a structure may have an increase in thickness due to additional structures required for surface mounting. Also, when an exterior case is used, an electrolyte spill in a vulnerable area of the exterior case during subsequent processes (aging, soldering reflow, or the like) may be caused, and thus the reliability and lifespan of a chip-type electric double layer capacitor may be reduced.

SUMMARY

An aspect of the present invention provides a chip-type electric double layer capacitor which may be reduced in size and weight and surface-mounted by improving an upper structure without an additional structure and may effectively prevent an electrolyte spill.

An aspect of the present invention also provides a chip-type electric double layer capacitor which may be reduced in size and weight and surface-mounted by improving the joining structural integrity of an external terminal and a lower case without an additional structure and may effectively prevent an electrolyte spill.

According to an aspect of the present invention, there is provided a chip-type electric double layer capacitor including: a lower case having a housing space of which a top surface is opened and a first joint element provided along an upper end of a sidewall enclosing the housing space; an upper cap mounted on the lower case so as to cover the housing space, and having a second joint element provided at an edge adjacent area corresponding to the first joint element and conforming to a shape of the first joint element; first and second external terminals inserted into the lower case by insert injection molding, each having a first portion exposed to an outer surface of the lower case for external contact and a second portion exposed to an inner surface of the housing space for internal contact; and an electric double layer capacitor cell mounted in the housing space and electrically connected to the second portion of the first and second external terminals, wherein the first and second joint elements have a welded portion therebetween such that the housing space of the lower case is sealed by the upper cap, and the upper cap includes a shielding portion provided inwardly of the second joint element and extending downwardly.

The shielding portion may extend downwardly so as to be lower than the welded portion.

The shielding portion may be spaced apart from the second joint element. The shielding portion may be pressed and attached to an upper surface of the electric double layer capacitor cell mounted in the housing space.

The first joint element may be a recess stepped towards the housing space and the second joint element may be a projection corresponding to the recess. The welded portion may be obtained such that a welding portion prepared at an end of the projection may be welded on a surface thereof in contact with the recess.

The first portion of the first and second external terminals may be exposed to the same outer surface of the lower case. The same outer surface may be provided as a mounting surface for the chip-type electric double layer capacitor.

The second portion of the first and second external terminals may extend to side surfaces connected to the mounting surface.

The electric double layer capacitor cell may be electrically connected to the second portion of the first and second external terminals by welding or ultrasonic welding.

According to another aspect of the present invention, there is provided a method of manufacturing a chip-type electric double layer capacitor, the method including: preparing a lower case having a housing space of which a top surface is opened, a first joint element formed along an upper end of a sidewall enclosing the housing space, and first and second external terminals inserted therein by insert injection molding in order that each of the first and second external terminals has a first portion exposed to an outer surface of the lower case and a second portion exposed to an inner surface of the housing space; mounting an electric double layer capacitor cell in the housing space and electrically connecting the electric double layer capacitor cell to the second portion of the first and second external terminals exposed to the inner surface of the housing space; mounting an upper cap on the lower case, the upper cap having a second joint element formed at an edge adjacent area corresponding to the first joint element and conforming to a shape of the first joint element; and welding the first and second joint elements to have a welded portion therebetween such that the housing space of the lower case is sealed by the upper cap, wherein the upper cap further includes a shielding portion formed inwardly of the second joint element and extending downwardly.

The welding of the first and second joint elements may be performed while allowing the shielding portion to be pressed and attached to an upper surface of the electric double layer capacitor cell mounted in the housing space.

The welding of the first and second joint elements may be performed by ultrasonic welding.

According to another aspect of the present invention, there is provided a chip-type electric double layer capacitor including: a resin case having a housing space provided therein and formed of insulating resin; first and second external terminals inserted into the resin case by insert injection molding, each having a first portion exposed to an outer surface of the resin case for external contact and a second portion exposed to an inner surface of the housing space for internal contact; a sealing portion including a groove portion provided in the resin case along a circumference of at least one of the first and second external terminals and a resin filling the groove portion; and an electric double layer capacitor cell mounted in the housing space and electrically connected to the second portion of the first and second external terminals.

The sealing portion may be provided to both the first and second external terminals individually. The sealing portion may be provided to enclose the circumference of the first and second external terminals. The sealing portion may be provided in part of the circumference of the first and second external terminals.

The groove portion may be provided in the inner surface of the housing space along a circumference of the second portion of the first and second external terminals. The groove portion may be provided in the outer surface of the resin case along a circumference of the first portion of the first and second external terminals.

The first portion of the first and second external terminals may be exposed to the same outer surface of the resin case. The same outer surface may be provided as a mounting surface for the chip-type electric double layer capacitor.

The second portion of the first and second external terminals may extend to side surfaces connected to the mounting surface.

The resin case may include a lower case having a housing space of which a top surface is opened and formed together with the first and second external terminals by insert injection molding, and an upper cap mounted on the lower case so as to cover the housing space.

The upper cap may be mounted on the lower case by using an adhesive. The electric double layer capacitor cell may be electrically connected to the second portion of the first and second external terminals by welding or ultrasonic welding.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF EMBODIMENTS

Exemplary embodiments of the present invention will now be described in detail with reference to the accompanying drawings.

Figure 1:
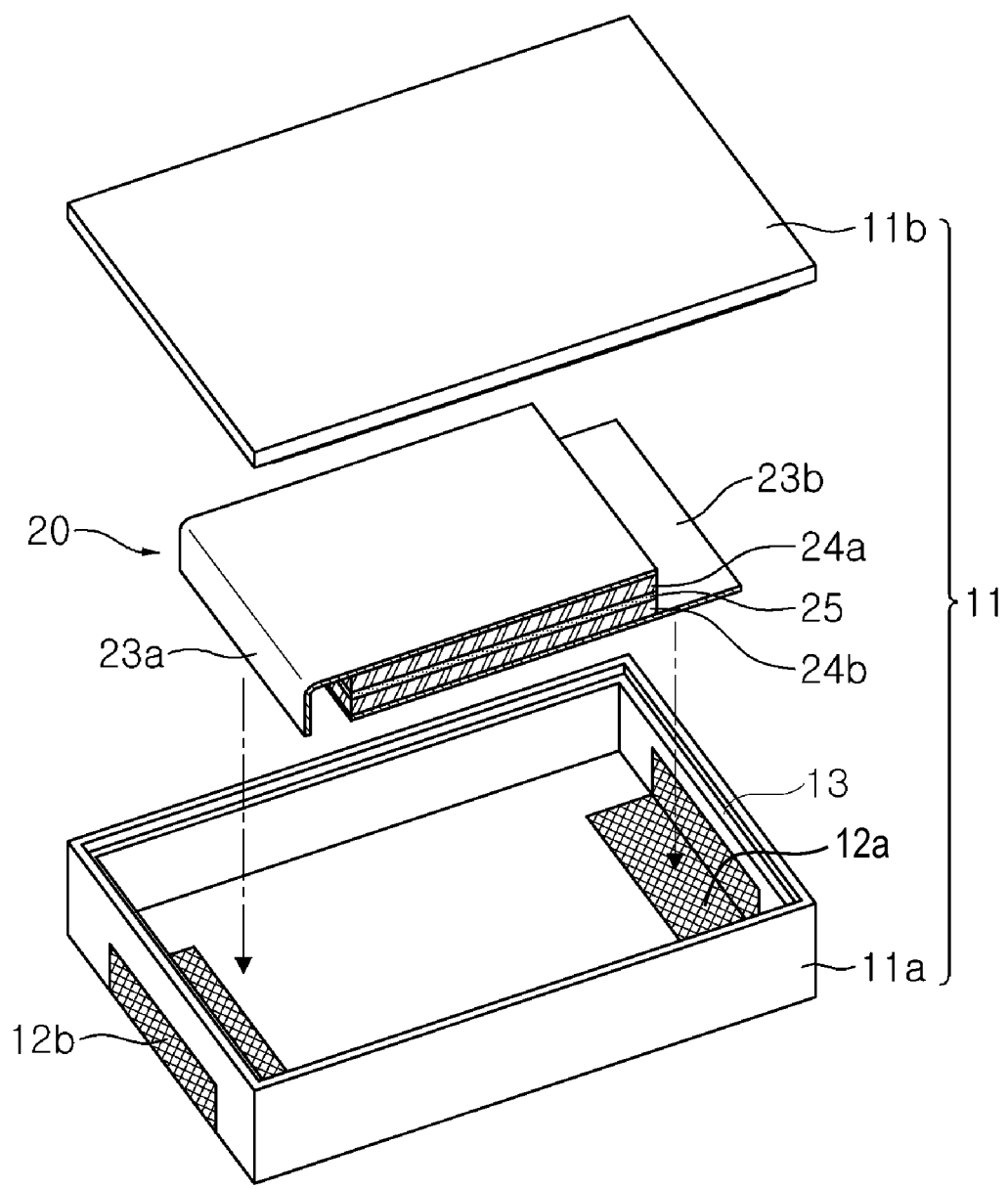
FIG. 1 is an exploded perspective view illustrating a chip-type electric double layer capacitor according to an exemplary embodiment of the present invention.

FIG. 1 is an exploded perspective view illustrating a chip-type electric double layer capacitor according to an exemplary embodiment of the present invention.

With reference to FIG. 1, a chip-type electric double layer capacitor 10 according to this embodiment includes a resin case 11 having a housing space formed therein and an electric double layer capacitor cell 20 disposed in the housing space of the resin case 11.

The resin case 11 may be formed of insulating resin and include a lower case 11a and an upper cap 11b. The lower case 11a may have the housing space of which the top surface is opened and be formed together with first and second external terminals 12a and 12b by insert injection molding. The upper cap 11b may be mounted on the lower case 11a so as to cover the housing space.

For example, a mold having a desired resin-case shape is prepared. The first and second external terminals are disposed in the mold so as to be exposed to an outer surface of the resin case and an inner surface of the housing space. Insulating resin is injected into the mold.

A first portion exposed to the outer surface of the lower case 11a is provided as an external contact area for the connection with an external electrical circuit. A second portion exposed to the inner surface of the housing space is provided as an internal contact area for the connection with first and second current collectors 23a and 23b of the electric double layer capacitor cell 20.

The electric double layer capacitor cell 20 is mounted in the housing space of the lower case 11a. The electric double layer capacitor cell 20 may include the first and second current collectors 23a and 23b, first and second polarizable electrodes 24a and 24b connected to the first and second current collectors 23a and 23b, respectively, and a separator 25 interposed between the first and second polarizable electrodes 24a and 24b.

The electric double layer capacitor cell 20 used in this embodiment may be replaced with other cells being formed to have various shapes. For example, since the electric double layer capacitor cell 20 has high space utilization, a multi-layered electric double layer capacitor cell, a winding-type electric double layer capacitor cell or the like may be used.

In the present embodiment, the electric double layer capacitor cell 20 is electrically connected to the first and second external terminals 12a and 12b through the first and second current collectors 23a and 23b. Here, the shapes and the structures of the first and second current collectors 23a and 23b may be appropriately modified so as to make electrical connections with the first and second external terminals 12a and 12b.

The electric double layer capacitor cell 20 disposed in the housing space of the lower case 11a is electrically connected to portions of the first and second external terminals 12a and 12b exposed to the housing space.

Figure 2:
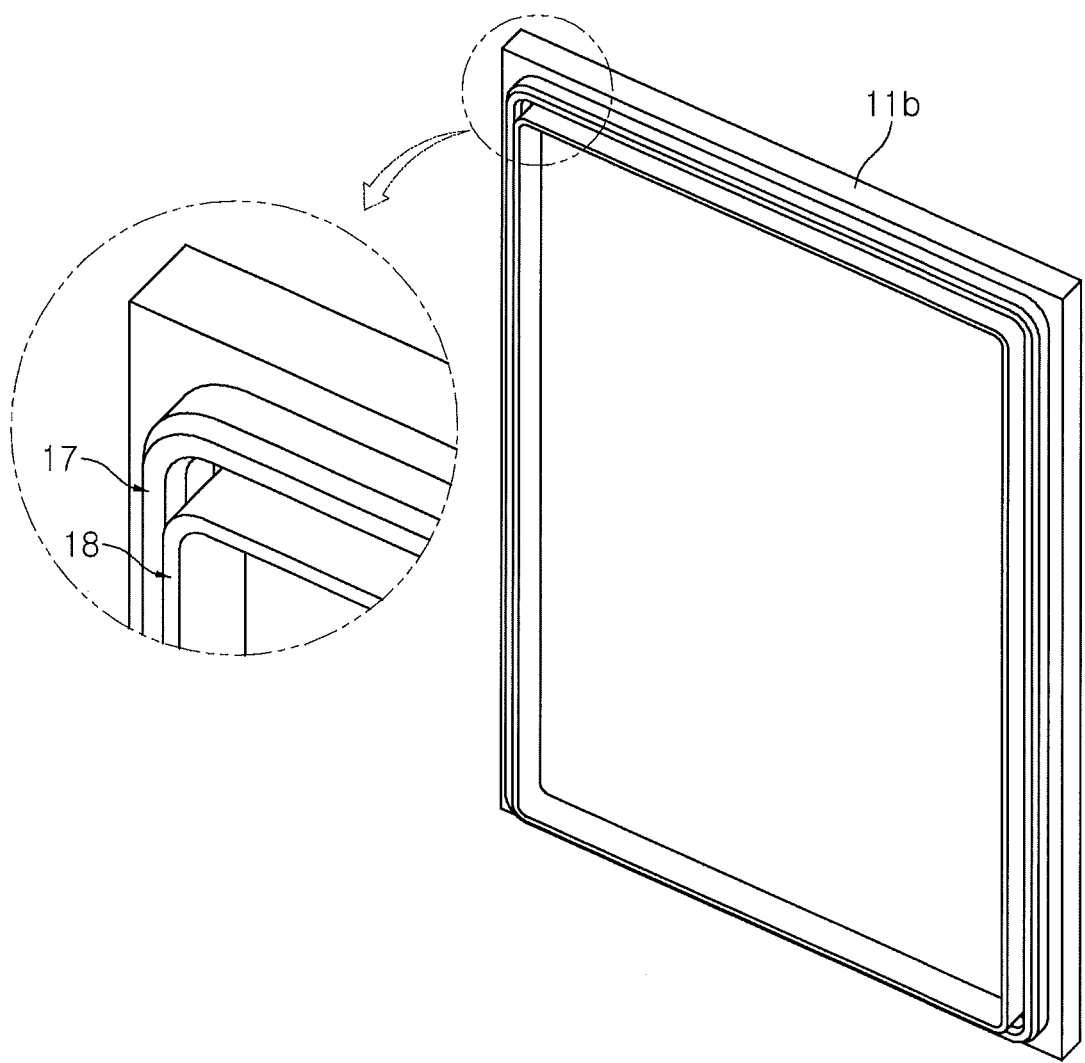
FIG. 2 is a schematic perspective view illustrating an upper cap employed in the chip-type electric double layer capacitor of FIG. 1.

The upper cap 11b employed in this embodiment is mounted on an upper end of a sidewall of the lower case 11a so as to cover the housing space. As shown in FIG. 1, the upper end of the sidewall of the lower case 11a has the structure of a recess 13 stepped inwardly. As shown in FIG. 2, the upper cap 11b has a projection 17 so as to be received in the recess 13 of the upper end of the sidewall of the lower case 11a.

In the present embodiment, the lower case 11a and the upper cap 11b are formed, by way of example, in such a manner that the lower case 11a has the recess 13 and the upper cap 11b has the projection 17, in which the recess 13 and the projection 17 have shapes corresponding to each other and are positioned to correspond to each other. In contrast, the lower case 11a may have a projection and the upper cap 11b may have a recess in a corresponding manner. However, the invention is not limited thereto. A variety of structures may be employed, as long as the structures are designed for the mounting of the upper cap so as to appropriately position the upper cap.

The upper cap 11b employed in this embodiment has a shielding portion 18 formed inwardly of the projection 17 and conforming thereto. The shielding portion 18 may be a single injection-molding element formed of the same resin as that of the upper cap 11a.

The shielding portion 18 extends downwardly. Preferably, the shielding portion 18, as shown in FIG. 2, may extend further downwardly than the projection 17. When the projection 17 and the recess 13 are welded, the welding process may be interfered by an electrolyte spilled from the polarizable electrodes 24a and 24b. Particularly, ultrasonic welding increases the possibility of contact with the electrolyte due to vibrations, so that serious welding interference may be caused. The extended shielding portion 18 may effectively prevent the electrolyte from reaching a portion to be welded.

Consequently, this may contribute to an improvement in reliability as well as to the lifespan of the electric double layer capacitor cell 20.

According to this embodiment, the first and second external terminals 12a and 12b may be formed on the same surface of the lower case 11a. The same surface may be provided as a mounting surface for the chip-type electric double layer capacitor 10. Such a structure may allow for surface mounting without an additional structure.

As shown in FIG. 1, the first and second external terminals 12a and 12b may extend from both ends of the same surface to both side surfaces connected to the ends, respectively. Therefore, when the chip-type electric double layer capacitor 10 is surface-mounted, its performance test may be performed by utilizing portions of the first and second external terminals 12a and 12b extending to the side surfaces.

FIGS. 3A through 3D are cross-sectional views illustrating a method of manufacturing a chip-type electric double layer capacitor according to an exemplary embodiment of the present invention.

Figure 3A:
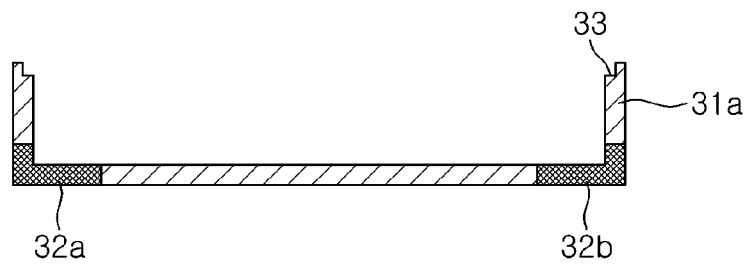
FIGS. 3A through 3D are cross-sectional views illustrating a method of manufacturing a chip-type electric double layer capacitor according to an exemplary embodiment of the present invention.

As shown in FIG. 3A, a lower case 31a is firstly prepared such that the lower case 31a has a housing space of which the top surface is opened and includes a first joint element 33 formed along an upper end of a sidewall enclosing the housing space.

The lower case 31a includes first and second external terminals 32a and 32b inserted therein so as to be exposed to both an inner surface of the housing space and an outer surface of the lower case 31a. The first joint element 33 may be a recess stepped inwardly, which is similar to the shape as shown in FIG. 1.

The lower case 31a is formed of insulating resin which may prevent the internal structure of a chip-type electric double layer capacitor from being deformed during a surface mounting process at a high temperature (e.g., about 240° C. to 270° C.). For example, the insulating resin may be polyphenylene sulfide (PPS) or liquid crystal polymer (LCP).

Figure 3B:
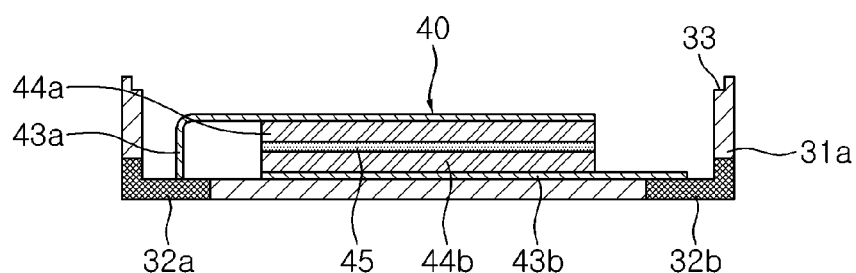

Sequentially, as shown in FIG. 3B, an electric double layer capacitor cell 40 is mounted in the housing space. The electric double layer capacitor cell 40 is electrically connected to portions of the first and second external terminals 32a and 32b exposed to the inner surface of the housing space.

The electric double layer capacitor cell 40 may include first and second current collectors 43a and 43b, first and second polarizable electrodes 44a and 44b connected to the first and second current collectors 43a and 43b, respectively, and a separator 45 interposed between the first and second polarizable electrodes 44a and 44b.

The first and second current collectors 43a and 43b may be formed of a metallic foil such as a copper foil. Meanwhile, the first and second polarizable electrodes 44a and 44b may be formed of a polarizable electrode material. Particularly, activated carbon with a relatively high specific surface area may be used. The first and second polarizable electrodes 44a and 44b may be manufactured by making an electrode material mainly consisting of powdered activated carbon into a solid-state sheet or adhering electrode material slurry onto the first and second current collectors 43a and 43b.

The separator 45 may be formed of a porous material through which ions can permeate. For example, a porous material such as polypropylene, polyethylene, or glass fiber may be used. However, the material is not limited thereto.

The connection between the electric double layer capacitor cell 40 and the first and second external terminals 32a and 32b may be made by welding or ultrasonic welding. Resistance welding or arc welding may be applied, but the connecting method is not limited thereto. Portions of the first and second external terminals 32a and 32b exposed to the outer surface of the lower case 31a are used to electrically connect the electric double layer capacitor cell 40 to an external power source.

Figure 3C:
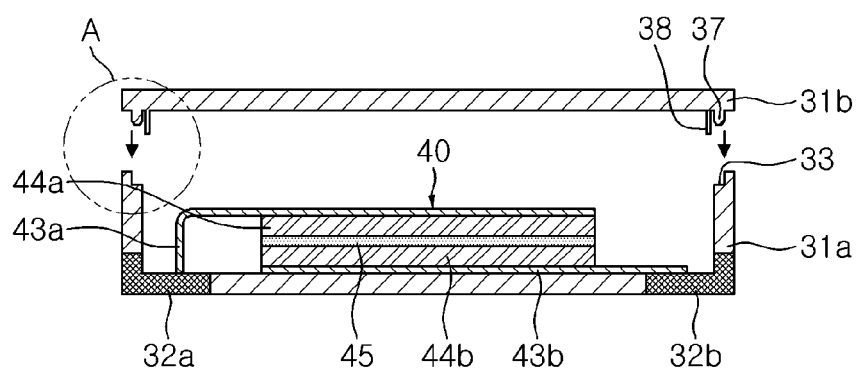

Next, as shown in FIG. 3C, the upper cap 31b is mounted on the lower case 31a so as to cover the housing space thereof.

The upper cap 31b has a second joint element 37 formed at an edge adjacent area corresponding to the first joint element 33 and conforming to the shape thereof. The second joint element 37 may be a projection, which is similar to the shape as shown in FIG. 1. Also, the upper cap 31b further includes a shielding portion 38 formed inwardly of the second joint element 37 and extending downwardly. Preferably, as illustrated in this embodiment, the shielding portion 38 extends downwardly so as to be lower than a portion to be welded.

Figure 4:
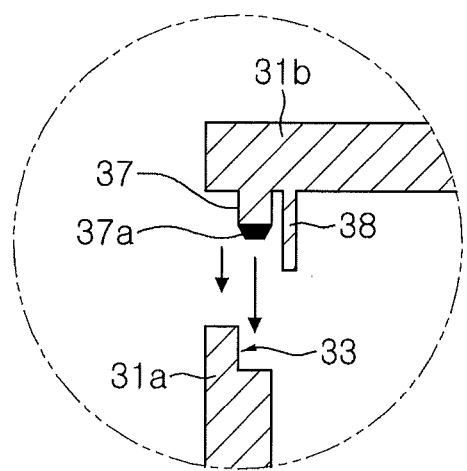
FIG. 4 is a partially enlarged view of portion A in the cross-sectional view of FIG. 3C.

The shielding portion 38, as shown in the partially enlarged view of FIG. 4, may be spaced apart from the second joint element 37. A welding portion 37a provided at an end of the second joint element 37 may be welded on a surface thereof in contact with the first joint element 33. The welding portion 37a may be melted during a welding process such as ultrasonic welding so that the upper cap 41b and the lower case 41a may be joined.

Figure 3D:
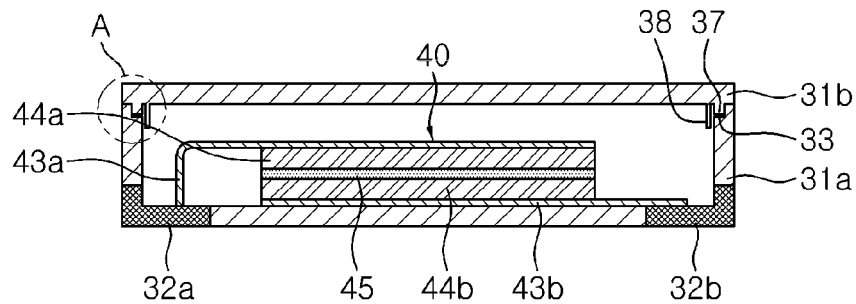

Then, as shown in FIG. 3D, the first and second joint elements 33 and 37 are welded at the joined portion thereof in order that the housing space of the lower case 31a may be sealed by the upper cap 31b.

Figure 5:
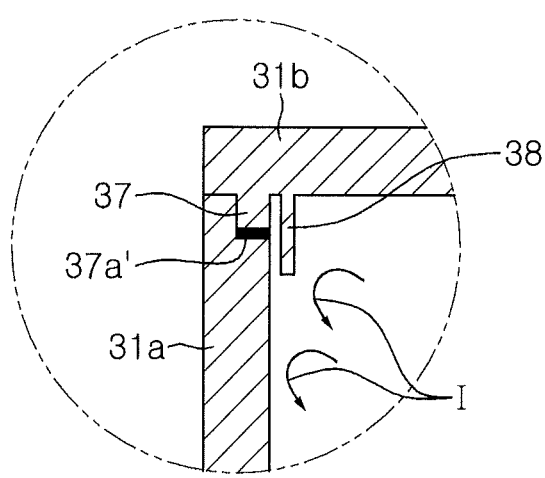
FIG. 5 is a partially enlarged view of portion B in the cross-sectional view of FIG. 3D.

As described above, the welding process may be performed by ultrasonic welding. In the case of ultrasonic welding, an electrolyte impregnated in the polarizable electrodes may be spilled due to vibrations, a welded portion 37a' may be polluted by the spilled electrolyte I, and thus this may prevent a complete seal being realized. As shown in FIG. 5, however, the present embodiment employs the shielding portion 38 to thereby effectively prevent the pollution caused by the electrolyte.

Figure 6:
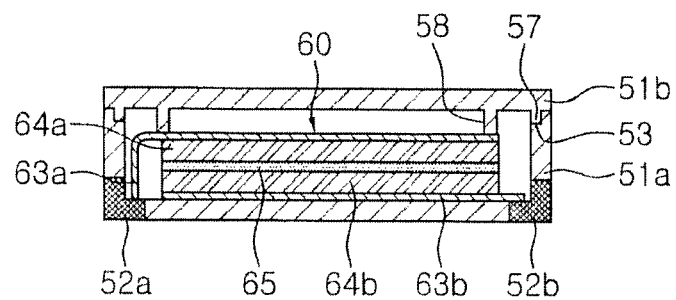
FIG. 6 is a side cross-sectional view illustrating a chip-type electric double layer capacitor according to another exemplary embodiment of the present invention.

FIG. 6 is a side cross-sectional view illustrating a chip-type electric double layer capacitor according to another exemplary embodiment of the present invention.

With reference to FIG. 6, a chip-type electric double layer capacitor 50 according to this embodiment includes a lower case 51a having a housing space formed therein, an electric double layer capacitor cell 60 disposed in the housing space of the lower case 51a, and an upper cap 51b covering the housing space of the lower case 51a.

The lower case 51a may be formed of insulating resin, and formed together with first and second external terminals 52a and 52b by insert injection molding in a manner such that the first and second external terminals 52a and 52b may be exposed to an outer surface of the lower case 51a and an inner surface of the housing space.

The electric double layer capacitor cell 60 is mounted in the housing space of the lower case 51a. The electric double layer capacitor cell 60 may include first and second current collectors 63a and 63b, first and second polarizable electrodes 64a and 64b connected to the first and second current collectors 63a and 63b, respectively, and a separator 65 interposed between the first and second polarizable electrodes 64a and 64b.

In the present embodiment, the electric double layer capacitor cell 60 is electrically connected to the first and second external terminals 52a and 52b through the first and second current collectors 63a and 63b. The electric double layer capacitor cell 60 disposed in the housing space of the lower case 51a is electrically connected to portions of the first and second external terminals 52a and 52b exposed to the housing space.

The upper cap 51b employed in this embodiment is disposed on an upper end of a sidewall of the lower case 51a so as to cover the housing space. The upper end of the sidewall of the lower case 51a has a recess 53 stepped inwardly. Also, the upper cap 51b has a projection 57 received in the recess 53 of the lower case 51a.

The upper cap 51b has a shielding portion 58 formed inwardly of the projection 57 and conforming thereto. The shielding portion 58 employed in this embodiment extends downwardly. The shielding portion 58 is positioned to correspond to the electric double layer capacitor cell 60 such that it may be pressed and adhered to an upper surface of the electric double layer capacitor cell 60 after welding. To this end, the welding process after disposing the upper cap 51b is performed in the situation that the upper cap 51b is pressed by a predetermined pressure. In this case, since the electric double layer capacitor cell 60 is pressed by a predetermined pressure, an increase in product capacitance and a reduction in resistance may be achieved.

Also, the shielding portion 58 may effectively prevent the welded portion of the projection and the recess from being polluted by an electrolyte spilled in the polarizable electrodes 64a and 64b. Consequently, this may contribute to an improvement in reliability as well as to the lifespan of the electric double layer capacitor cell 60.

Figure 7:
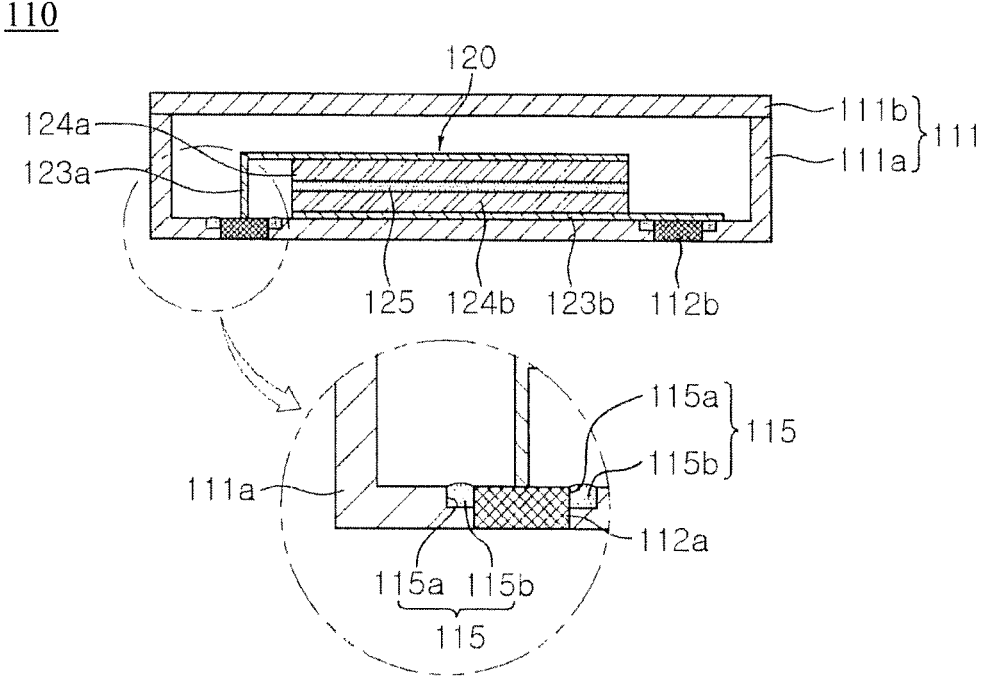
FIG. 7 is a side cross-sectional view illustrating a chip-type electric double layer capacitor according to another exemplary embodiment of the present invention.

FIG. 7 is a side cross-sectional view illustrating a chip-type electric double layer capacitor according to another exemplary embodiment of the present invention.

With reference to FIG. 7, a chip-type electric double layer capacitor 100 according to this embodiment includes a resin case 111 having a housing space formed therein, and an electric double layer capacitor cell 120 disposed in the housing space of the resin case 111.

The resin case 111 is formed of insulating resin which may prevent the internal structure of the chip-type electric double layer capacitor 100 from being deformed during a surface mounting process at a high temperature (e.g., about 240° C. to 270° C.). For example, the insulating resin may be polyphenylene sulfide (PPS) or liquid crystal polymer (LCP).

The resin case 111 includes first and second external terminals 112a and 112b exposed to an outer surface of the resin case 111 and an inner surface of the housing space. A first portion exposed to the outer surface of the resin case 111 is provided as an external contact area for the connection with an external electrical circuit. A second portion exposed to the inner surface of the housing space is provided as an internal contact area for the connection with first and second current collectors 123a and 123b of the electric double layer capacitor cell 120.

According to this embodiment, the resin case 111 may include a lower case 111a having the housing space of which the top surface is opened and being formed together with the first and second external terminals 112a and 112b by insert injection molding, and an upper cap 111b mounted on the lower case 111a so as to cover the housing space. The upper cap 111b may be mounted on the lower case 111a by using an adhesive.

The lower case 111a may be formed in various manners. For example, a mold having a desired resin-case shape is prepared. The first and second external terminals 112a and 112b are disposed in the mold so as to be exposed to the outer surface of the resin case and the inner surface of the housing space. Insulating resin is injected into the mold.

The electric double layer capacitor cell 120 is mounted in the housing space of the resin case 111.

The electric double layer capacitor cell 120 may include the first and second current collectors 123a and 123b, first and second polarizable electrodes 124a and 124b connected to the first and second current collectors 123a and 123b, respectively, and a separator 125 interposed between the first and second polarizable electrodes 124a and 124b.

The first and second current collectors 123a and 123b may be formed of a metallic foil such as a copper foil. Meanwhile, the first and second polarizable electrodes 124a and 124b may be formed of a polarizable electrode material. Particularly, activated carbon with a relatively high specific surface area may be used. The first and second polarizable electrodes 124a and 124b may be manufactured by making an electrode material mainly consisting of powdered activated carbon into a solid-state sheet or adhering electrode material slurry onto the first and second current collectors 123a and 123b.

The separator 125 may be formed of a porous material through which ions can permeate. For example, a porous material such as polypropylene, polyethylene, or glass fiber may be used. However, the material is not limited thereto.

The electric double layer capacitor cell 120 used in this embodiment may be replaced with other cells being formed to have various shapes. For example, since the electric double layer capacitor cell 120 has high space utilization, a multi-layered electric double layer capacitor cell, a winding-type electric double layer capacitor cell or the like may be used.

In the present embodiment, the electric double layer capacitor cell 120 is electrically connected to the first and second external terminals 112a and 112b through the first and second current collectors 123a and 123b. Herein, the shapes and the structures of the first and second current collectors 123a and 123b may be appropriately modified so as to make electrical connections with the first and second external terminals 112a and 112b.

The electric double layer capacitor cell 120 disposed in the housing space of the resin case 111 is electrically connected to portions of the first and second external terminals 112a and 112b exposed to the housing space. The connection between the electric double layer capacitor cell 120 and the first and second external terminals 112a and 112b may be made by welding or ultrasonic welding. Resistance welding or arc welding may be applied, but the connecting method is not limited thereto.

Portions of the first and second external terminals 112a and 112b exposed to the outer surface of the resin case 111 are used to electrically connect the electric double layer capacitor cell 120 to an external power source.

In the present embodiment, the first and second external terminals 112a and 112b may be formed on the same surface of the resin case 111. The same surface may be provided as a mounting surface for the chip-type electric double layer capacitor 100. Such a structure may allow for surface mounting without an additional structure.

The chip-type electric double layer capacitor 100 according to this embodiment includes a sealing portion 115 having a groove portion 115a formed around the first and second external terminals 112a and 112b and a resin 115b filling the groove portion 115a. Herein, the groove portion 115a may be formed around the first and second external terminals 112a and 112b by using a mold having a convex shape while the resin case 111 is formed by injection molding.

In general, the first and second external terminals 112a and 112b and the resin case 111 are integrated by insert injection molding, but a minute crack may be caused therebetween due to heterogeneity between the materials thereof. The minute crack may allow the electrolyte to be spilled. Particularly, such an electrolyte spill may be caused during the mounting process and the use of the capacitor, and thus reliability may be reduced or lifespan may be lessened.

In order to prevent the electrolyte spill, the sealing portion 115 may allow for the sealing of the minute crack between the first and second external terminals 112a and 112b and the lower case 111b. In this manner, the electrolyte spill caused by external influences (e.g., vibrations) generated in the joining (e.g., ultrasonic welding) of the electric double layer capacitor cell 120 and the external terminals 112a and 112b may be effectively prevented.

Furthermore, the sealing portion 115 may contribute to an improvement in reliability as well as to the lifespan of the electric double layer capacitor cell 120.

Figure 8:
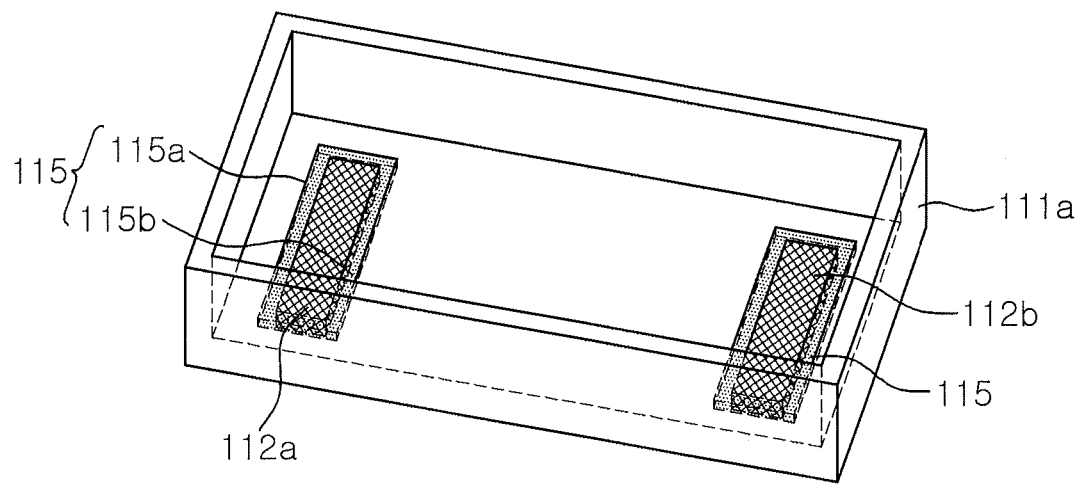
FIG. 8 is a schematic perspective view illustrating a lower case employed in the chip-type electric double layer capacitor of FIG. 7.

As shown in FIG. 8, the sealing portion 115 may be provided to both the first and second external terminals 112a and 112b. Also, the sealing portion 115 may be formed to enclose the circumference of the first and second external terminals 112a and 112b. In this manner, the first and second external terminals 112a and 112b and the lower case 111b may be joined more completely.

Also, the groove portion 115a employed in this embodiment is formed in the inner surface of the housing space of the resin case 111. Therefore, the resin 115b filling the groove portion 115a is applied before the mounting of the electric double layer capacitor cell 120.

Contrary to the present embodiment, the sealing portion may be formed around any one of the first and second external terminals according to necessity. Also, the sealing portion may be provided by forming the groove portion in a necessary portion of the first and second external terminals without completely enclosing the circumference thereof.

The resin 115b used in the sealing portion 115 may be the same as that of the resin case 111. However, the resin 115b may also be different resin having superior malleability or strength in the joining of metals to the insulating resin of the resin case 111. The resin 115b of the sealing portion 115 may be curable resin such as epoxy resin, but is not limited thereto.

For example, multifunctional epoxy resin having two or more epoxy groups in a molecule, such as bisphenol A epoxy resin and bisphenol novolac epoxy resin, may be used as the epoxy resin for the resin 115b of the sealing portion 115. The epoxy resin may include a cross-liking agent, if necessary.

A chip-type electric double layer capacitor employed in the present invention may be modified in a variety of forms. Particularly, the structure of a lower case may be diversely modified according to shapes of external terminals.

Figure 9:
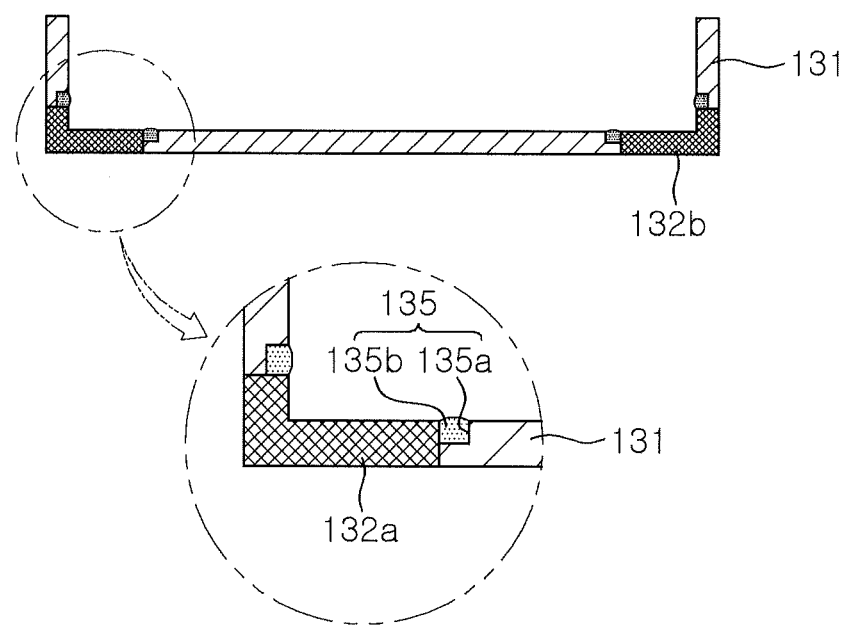
FIG. 9 is a side cross-sectional view illustrating a lower case employed in a chip-type electric double layer capacitor according to another exemplary embodiment of the present invention.

FIG. 9 is a side cross-sectional view illustrating a lower case of a chip-type electric double layer capacitor according to another exemplary embodiment of the present invention.

Figure 10:
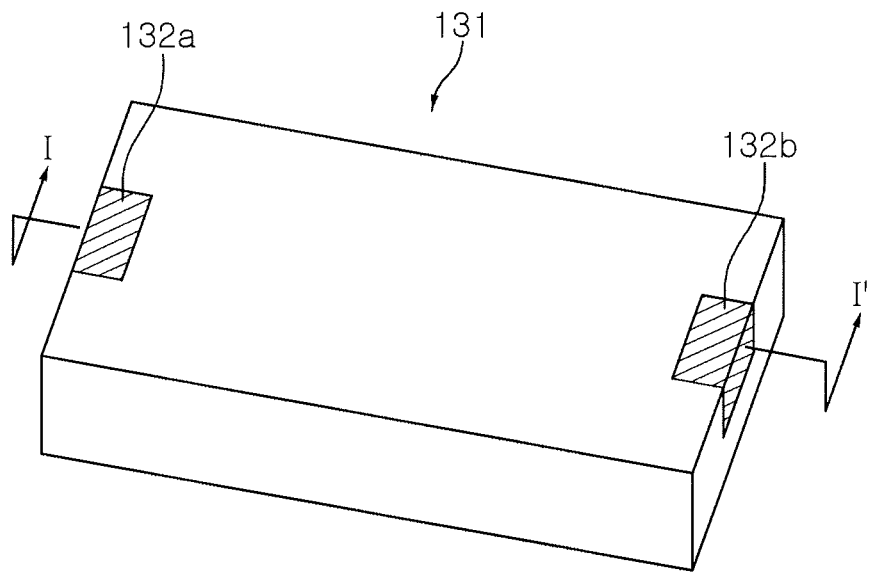
FIG. 10 is a schematic perspective view illustrating the lower case of FIG. 9 as seen from below.

A lower case 131 of FIG. 9 is understood with reference to a side cross-sectional view of the lower case shown in FIG. 10, taken along line I-I'.

With reference to FIGS. 9 and 10, the lower case 131 illustrated in this embodiment has a structure similar to that of FIG. 7 such that first and second external terminals 132a and 132b are disposed on the same surface, in which the same surface serves as a mounting surface. However, the first and second external terminals 132a and 132b may extend from both ends of the same surface to both side surfaces connected to the ends, respectively. FIG. 9 shows a sealing part 135, a groove portion 135a, and a resin 135b filling the groove portion.

When a chip-type electric double layer capacitor according to this embodiment is surface-mounted, its performance test may be performed by utilizing portions of the first and second external terminals 132a and 132b extending to the side surfaces.

Figure 11:
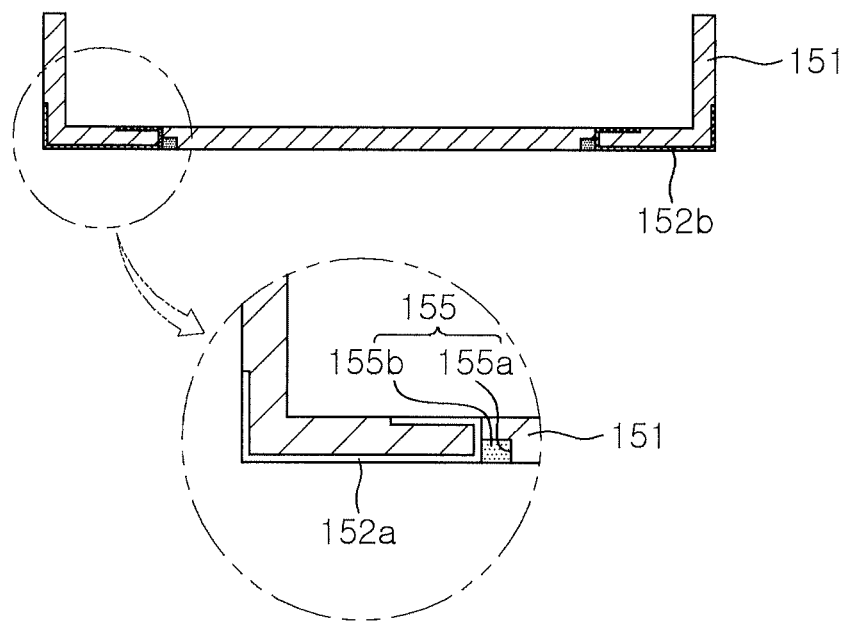
FIG. 11 is a side cross-sectional view illustrating a lower case employed in a chip-type electric double layer capacitor according to another exemplary embodiment of the present invention.

In the above-described embodiment, the sealing portion is formed on the inner surface of the housing space. However, the invention is not limited thereto. That is, the sealing portion may, if necessary, be formed on the outer surface of the lower case such that the sealing portion may be provided at boundary surfaces between the resin case and the external terminals, respectively. FIG. 11 illustrates a lower case employed in a chip-type electric double layer capacitor according to another exemplary embodiment of the present invention, in which the lower case has a sealing portion formed on the outer surface thereof.

With reference to FIG. 11, a lower case 151 formed together with first and second external terminals 152a and 152b by insert injection molding is illustrated. The first and second external terminals 152a and 152b employed in the present embodiment may have a plate structure, and portions thereof are bent at 180 degrees. This structure allows for an increase in contact area with the lower case 151, so that strong joining may be ensured.

A groove portion 155a is formed around the circumference of the first and second external terminals 152a and 152b on the outer surface of the lower case 151 and the groove portion 155a is filled with resin 155b, thereby forming a desired sealing portion 155.

As shown in FIG. 11, the sealing portion 155 may be formed outside a bent portion, i.e., a connecting portion of the inner and outer surfaces of the lower case 151 in a thickness direction thereof, of the first and second external terminals 152a and 152b without completely enclosing the entirety thereof.

According to this embodiment, since an electrolyte spill in the inside of the bent portion of the first and second external terminals 152a and 152b is properly prevented, an electrolyte spill may be effectively avoided with the sealing portion 155 formed only in the limited area.

Individual features in the above-described exemplary embodiments may be combined to constitute another embodiment, unless explicitly described to the contrary. For example, the upper cap of FIG. 2 may be combined with the lower case employed in the other exemplary embodiments of the invention to thereby realize a new form, which is also included within scope of the invention.

As set forth above, according to exemplary embodiments of the invention, a chip-type electric double layer capacitor employs a shielding portion in an upper cap so that an electrolyte spill in a polarizable electrode during ultrasonic welding may be prevented and sealing interference caused thereby may be avoided. Since the shielding portion formed inwardly presses an electric double layer capacitor cell, an increase in product capacitance and a reduction in resistance may be achieved.

A sealing portion, prepared by using a groove portion formed around an external terminal, is used to appropriately seal a minute crack between an external terminal and a lower case. The sealing portion may effectively prevent an electrolyte spill caused by external influences such as vibrations generated when the external terminal and an electrode of a capacitor are joined through a welding process such as ultrasonic welding.

Consequently, a chip-type electric double layer capacitor according to exemplary embodiments of the invention has an improvement in reliability, as well as to the lifespan of an electric double layer capacitor cell.

While the present invention has been shown and described in connection with the exemplary embodiments, it will be apparent to those skilled in the art that modifications and variations can be made without departing from the spirit and scope of the invention as defined by the appended claims.

What is claimed is:

1. A chip-type electric double layer capacitor comprising:
a resin case having a housing space provided therein and formed of insulating resin;
first and second external terminals substantially entirely inserted into the resin case, each of the terminals having a first portion exposed to an outer surface of the resin case for external contact and a second portion exposed to an inner surface of the housing space for internal contact;
a sealing portion including a groove portion provided in the resin case along a circumference of at least one of the first and second external terminals and a resin filling the groove portion; and
an electric double layer capacitor cell mounted in the housing space and electrically connected to the second portion of the first and second external terminals,
wherein the second portion of the first and second external terminals extends to side surfaces connected to a mounting surface for the chip-type electric double layer capacitor.

2. The chip-type electric double layer capacitor of claim 1, wherein the sealing portion is provided to both the first and second external terminals individually.

3. The chip-type electric double layer capacitor of claim 2, wherein the sealing portion encloses the circumference of the first and second external terminals.

4. The chip-type electric double layer capacitor of claim 2, wherein the sealing portion is provided in part of the circumference of the first and second external terminals.

5. The chip-type electric double layer capacitor of claim 4, wherein the groove portion is provided in the inner surface of the housing space along a circumference of the second portion of the first and second external terminals.

6. The chip-type electric double layer capacitor of claim 4, wherein the groove portion is provided in the outer surface of the resin case along a circumference of the first portion of the first and second external terminals.

7. The chip-type electric double layer capacitor of claim 1, wherein the first portion of the first and second external terminals is exposed to the same outer surface of the resin case, and
the same outer surface is provided as the mounting surface for the chip-type electric double layer capacitor.

8. The chip-type electric double layer capacitor of claim 1, wherein the resin case comprises:
a lower case for providing the housing space of which a top surface is opened and formed together with the first and second external terminals by insert injection molding; and
an upper cap mounted on the lower case so as to cover the housing space.

9. The chip-type electric double layer capacitor of claim 8, wherein the upper cap is mounted on the lower case by using an adhesive.

10. The chip-type electric double layer capacitor of claim 1, wherein the electric double layer capacitor cell is electrically connected to the second portion of the first and second external terminals by welding or ultrasonic welding.

11. The chip-type electric double layer capacitor of claim 1, wherein the first and second external terminals are inserted into the resin case to penetrate the resin case by insert injection molding.

12. The chip-type electric double layer capacitor of claim 1, wherein the groove portion is provided in an inner or outer surface of a wall of the resin case along the circumference of the at least one of the first and second external terminals, and
    the groove portion has a depth, from the inner or outer surface, that extends through less than an entire thickness of the wall.

13. The chip-type electric double layer capacitor of claim 1, wherein the first and second external terminals are in a wall of the resin case and are substantially entirely located between a plane defined by an outer surface of the wall and a plane defined by an inner surface of the wall.

\* \* \* \* \*